US010898023B2

(12) United States Patent
Savioz

(10) Patent No.: US 10,898,023 B2
(45) Date of Patent: Jan. 26, 2021

(54) MIXING AND FOAMING DEVICE

(71) Applicant: NESTEC S.A., Vevey (CH)

(72) Inventor: Gregory Savioz, Saxonne (CH)

(73) Assignee: Societe des Produits Nestle S.A., Vevey (CH)

( * ) Notice: Subject to any disclaimer, the term of this patent is extended or adjusted under 35 U.S.C. 154(b) by 59 days.

(21) Appl. No.: 16/060,196

(22) PCT Filed: Dec. 2, 2016

(86) PCT No.: PCT/EP2016/079568
§ 371 (c)(1),
(2) Date: Jun. 7, 2018

(87) PCT Pub. No.: WO2017/097674
PCT Pub. Date: Jun. 15, 2017

(65) Prior Publication Data
US 2018/0368611 A1  Dec. 27, 2018

(30) Foreign Application Priority Data

Dec. 10, 2015 (EP) .................................. 15199261

(51) Int. Cl.
*A47J 31/44* (2006.01)
*B01F 3/04* (2006.01)
(Continued)

(52) U.S. Cl.
CPC ....... *A47J 31/4485* (2013.01); *A47J 31/4453* (2013.01); *A47J 31/461* (2018.08);
(Continued)

(58) Field of Classification Search
CPC ........ A47J 31/4485; A47J 31/46; A47J 36/28; A47J 27/004; A47J 31/4496; A47J 31/461;
(Continued)

(56) References Cited

U.S. PATENT DOCUMENTS

| 8,733,234 | B2 * | 5/2014 | Boussemart | A47J 31/4489 99/323.1 |
| 2001/0002891 | A1 * | 6/2001 | Frankel | A47J 43/0716 366/146 |
| 2002/0089074 | A1 * | 7/2002 | Holl | B29C 48/38 261/92 |
| 2008/0166463 | A1 * | 7/2008 | Green | A47J 31/401 426/474 |

(Continued)

FOREIGN PATENT DOCUMENTS

| CN | 1725968 A | 1/2006 |
| CN | 201585860 U | 9/2010 |

(Continued)

*Primary Examiner* — Jyoti Chawla
(74) *Attorney, Agent, or Firm* — K&L Gates LLP

(57) ABSTRACT

The invention refers to a mixing and foaming device (300) for mixing a powder food or beverage product with a fluid and further foaming said mixture, the device (300) comprising a mixing, pumping and foaming unit (102), an air entry (30) and a fluid inlet (21); the mixing, pumping and foaming unit (102) comprising a pumping element (110) whose rotation allows both powder and fluid to enter a foaming chamber (121) of the mixing, pumping and foaming unit (102), where a foaming element (120) rotates relatively within the foaming chamber (121), subjecting the mixture of fluid, powder and optionally air to a certain level of shear stress which allows this mixture to mix and/or to foam. The invention further refers to a method for providing foam from a food or beverage product powder using such a device (300).

18 Claims, 3 Drawing Sheets

(51) Int. Cl.
*A47J 31/46* (2006.01)
*B01F 7/00* (2006.01)
*B01F 15/00* (2006.01)

(52) U.S. Cl.
CPC .......... *B01F 3/04446* (2013.01); *B01F 7/008* (2013.01); *B01F 15/00909* (2013.01); *B01F 2215/0006* (2013.01)

(58) Field of Classification Search
CPC .............. A47J 27/21041; A47J 43/0465; A47J 2202/00; A47J 36/24; A47J 31/4453; A23C 3/031; A23C 9/1524; A23C 7/00; B01F 7/008; B01F 15/00714; B01F 15/00909; B01F 3/04099; B01F 3/04446
USPC ......................................................... 426/474
See application file for complete search history.

(56) References Cited

U.S. PATENT DOCUMENTS

| | | | |
|---|---|---|---|
| 2009/0323459 A1* | 12/2009 | Windhab | B01F 3/04269 366/105 |
| 2010/0212508 A1* | 8/2010 | Buttiker | A47J 31/4485 99/290 |
| 2011/0262606 A1* | 10/2011 | Blondel | A47J 31/002 426/474 |
| 2015/0305549 A1* | 10/2015 | Perentes | A47J 31/4485 426/474 |

FOREIGN PATENT DOCUMENTS

| | | |
|---|---|---|
| CN | 103889287 A | 6/2014 |
| WO | 2005074770 | 8/2005 |
| WO | 2015197509 | 12/2015 |

* cited by examiner

MIXING AND FOAMING DEVICE

CROSS REFERENCE TO RELATED APPLICATIONS

The present application is a National Stage of International Application No. PCT/EP2016/079568, filed on Dec. 2, 2016, which claims priority to European Patent Application No. 15199261.7, filed on Dec. 10, 2015, the entire contents of which are being incorporated herein by reference.

FIELD OF THE INVENTION

The present invention is directed to a mixing and foaming device for first mixing a powder food or beverage product together with a fluid and then foaming this mixture, which can be optionally heated. The device of the invention delivers very high quality foam on demand, having a simple architecture and being easily cleanable. The invention is further related to a method for mixing and foaming such powder food or beverage product.

BACKGROUND OF THE INVENTION

Foams consist of two phases, an aqueous phase and a gaseous (air) phase. A fluid foam is therefore a substance which is formed by trapping many gas bubbles in a fluid structure: producing a fluid foam involves not only the generation of these gas bubbles, but also the packing and the retention of these bubbles into the overall fluid structure in order to provide a stable foam.

It is desirable to produce food foams obtained from food fluid products with the tiny and stable air bubbles to provide a light texture and different mouth feel. In most of the food foams, proteins are the main surface active agents helping in the formation and stabilization of the dispersed gaseous phase, creating protein-stabilized foams. Proteins will always have certain stresses to overcome, such as mechanical and gravitational: the capacity of proteins to stabilize the foaming structure formed against these stresses will determine foam stability, usually expressed as the time required for 50% of the fluid to drain from the foam, i.e., the time required for reaching a 50% reduction in the foam volume.

When foaming a fluid, it would be desirable to produce foam on demand, having a superior quality. Moreover, it would be desirable to provide this prime quality foam as quickly as possible and in a repeatable way, meaning that the foam quality is controlled and can be repeated from one fluid to another.

Several problems arise when a food or beverage product that is to be foamed is originally provided as a powder: the dissolution of powders in the preparation of beverages is often a challenge, as a proper mixing needs to be achieved before any foaming operation can begin, which requires complex and long operations which are not attractive for the consumer.

In the state of the art, several solutions exist for dissolving a powder, either using rotating mixers (a mixing bowl, for example), a water jet or pressurized water. However, in these known solutions, even when the dissolution obtained is of good quality, the foaming resulting from these mixing actions is often of mediocre quality.

Therefore, there is still a need to provide a device which is able to provide high quality foam from a food or beverage product originally provided as a powder, the device being at the same time simple and easy to use, providing this high quality foam on demand in a short time, in a reliable and repeatable way. Moreover, this device will be able to provide a large variety of food or beverage foams, such as for example milk foam or foams from vegetables. The present invention aims at providing a foaming device which addresses these and other needs as it will follow from the present Description.

SUMMARY OF THE INVENTION

According to a first aspect, the invention refers to a mixing and foaming device for mixing a powder food or beverage product with a fluid and further foaming said mixture, the device comprising a mixing, pumping and foaming unit, an air entry and a fluid inlet. The mixing, pumping and foaming unit comprises a pumping element whose rotation allows both powder and fluid to enter a foaming chamber of the mixing, pumping and foaming unit, where a foaming element rotates relatively within the foaming chamber, subjecting the mixture of fluid, powder and optionally air to a certain level of shear stress which allows this mixture to mix and/or to foam.

Preferably, the pumping element and the foaming element in the mixing and foaming device of the invention are both rotatable around a shaft and are entrained in rotation by driving means.

Also preferably, the foaming element comprises a rotatable element with respect to a stationary part in the foaming chamber defining a gap where the mixture of fluid, powder and optionally air is driven under shear stress. Typically, the rotatable element is configured as a cylinder, as a cone, as a disc or the like.

In the device of the invention, the gap in the foaming chamber is preferably comprised between 0.2 and 1 mm, more preferably between 0.3 and 0.6 mm.

Typically, the pumping element is configured as gears, and the module and/or number and/or height of the teeth configuring these gears, and the shape and/or size of the foaming element are calculated so as to have a specific balance of the mixing performance, the pumping performance and the foaming capability, respectively, provided by the device of the invention.

In the mixing and foaming device of the invention, the pumping element and the foaming element typically rotate at a speed comprised between 2000 and 10000 rpm, preferably between 4000 and 8000 rpm.

Besides, the mixing and foaming device preferably further comprises a valve regulating the amount of air introduced through the air entry. Also preferably, the device further comprises a check valve connected to the air entry preventing any back-pumping of fluid and/or powder.

The device of the invention typically further comprises a heating unit allowing heating the foam from the mixing, pumping and foaming unit before it is delivered.

Preferably, in the device of the invention, the powder food or beverage product is comprised in a container together with the fluid, the rotation of the pumping element pumping both fluid and powder from the container into the foaming chamber.

According to another embodiment, the powder food or beverage product is comprised in a reservoir configured as a pouch, as a sachet, as a capsule or the like. Typically, in the device according to this embodiment, the rotation of the pumping element pumps fluid into the reservoir where it is diluted with powder, the rotation of the pumping element further pushing fluid and powder into the foaming chamber.

According to a second aspect, the invention relates to a method for providing foam from a food or beverage product powder using a device as the one described where the powder food or beverage product and the fluid are comprised in a container, the method comprising the steps of:
- a) pumping fluid and powder from the container into the foaming chamber by rotating the pumping element;
- b) mixing fluid and powder in the foaming chamber by relatively rotating the foaming element within the foaming chamber and sending this mixture to the container;
- c) repeating steps a) and b) one or a plurality of times;
- d) opening the air entry to a certain level;
- e) pumping from the container into the foaming chamber the mixture of fluid and powder, together with air from the air entry by rotating the pumping element;
- f) subjecting the mixture of fluid and powder, together with air, to shear stress in the foaming chamber so that it foams.

Preferably, the method for providing foam from a food or beverage product powder using a device as the one described, where the powder food or beverage product is comprised in a container, configured as a sachet, as a pouch, as a capsule or the like, comprising the steps of:
- a) pumping fluid into a reservoir by rotating the pumping element, so that the powder is diluted with the fluid;
- b) mixing fluid and powder in the foaming chamber by relatively rotating the foaming element within the foaming chamber and sending this mixture to a fluid container;
- c) repeating steps a) and b) one or a plurality of times;
- d) opening the air entry to a certain level;
- e) pumping from the fluid container into the reservoir and then sending to the foaming chamber the mixture of fluid and powder, together with air from the air entry by rotating the pumping element;
- f) subjecting the mixture of fluid and powder, together with air, to shear stress in the foaming chamber so that it foams.

Preferably, the method of the invention further comprises a step where the foam is heated in the heating unit before it is finally delivered.

BRIEF DESCRIPTION OF THE DRAWINGS

Further features, advantages and objects of the present invention will become apparent for a skilled person when reading the following detailed description of non-limiting embodiments of the present invention, when taken in conjunction with the appended drawings, in which.

DETAILED DESCRIPTION OF EXEMPLARY EMBODIMENTS

The present invention addresses a device 300 for efficiently mixing, pumping and foaming a powder for the preparation of beverages or food products. As it will be further explained in detail, the device 300 allows for efficiently foaming the mixture of fluid and powder using the Couette Flow effect.

Figure 1:
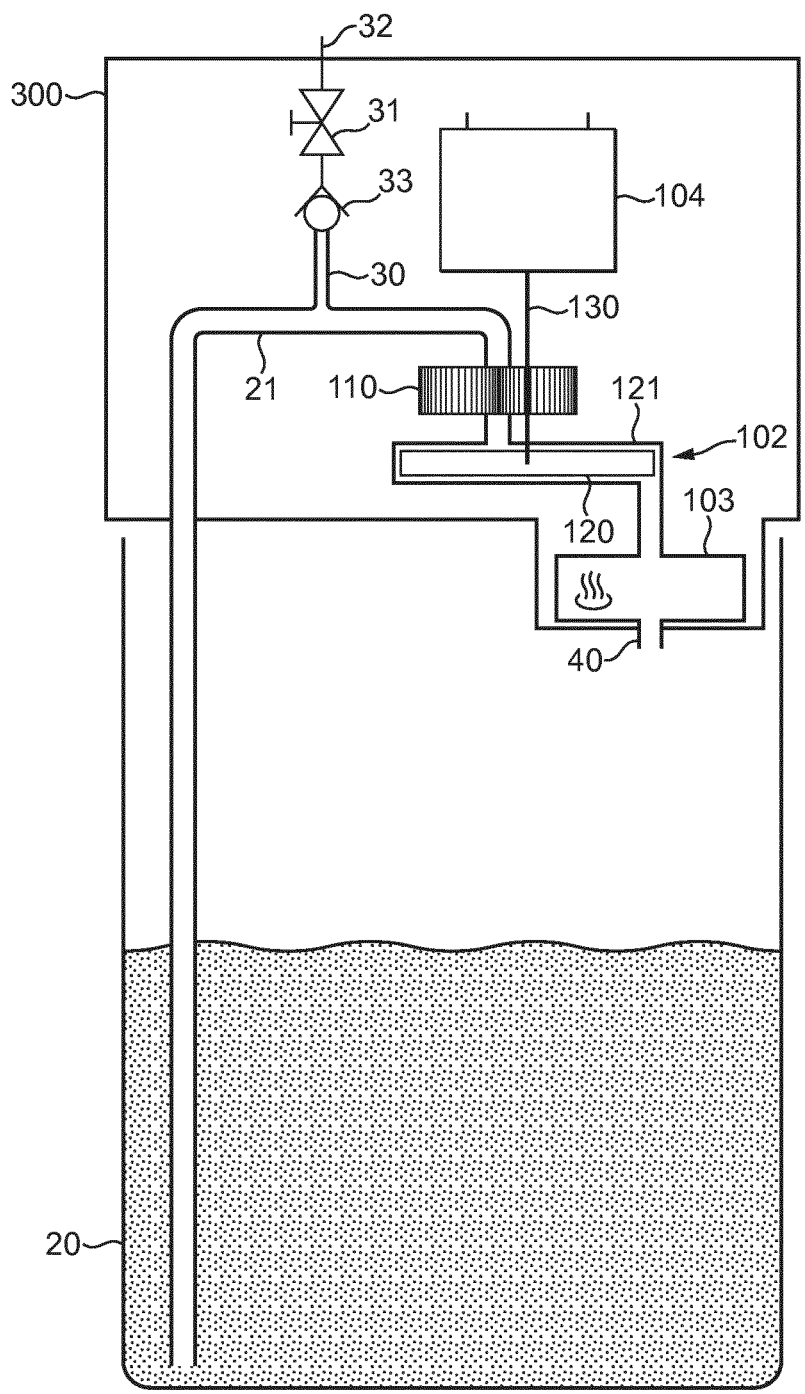
FIG. 1 shows a schematic view of a mixing and foaming device according to a first possible embodiment of the present invention.

With reference to FIG. 1, the device 300 of the invention typically comprises a container 20 where a powder and a fluid (typically water) are arranged: the powder and fluid are not well mixed yet, so the powder is roughly dispersed in the fluid. The container 20 can also be a glass, a cup or similar not being part of the device. The device 300 further comprises a mixing, pumping and foaming unit 102 where the fluid and powder will be pumped and also foamed. The mixing, pumping and foaming unit 102 comprises a pumping element 110 and a foaming element 120, effecting pumping and foaming functions, respectively. The device 300 further comprises a fluid inlet 21 communicating the mixing, pumping and foaming unit 102 with the container 20 and an air entry 30 communicating with the fluid inlet 21: preferably, the air entry 30 comprises a check valve 33 preventing any pumping of fluid and/or powder into the air entry 30, and a valve 31 for regulating the amount of air introduced through the air entry 30 into the fluid inlet 21. Optionally, the device 300 can further comprise a heating unit 103 for heating the foam before it is delivered through a foam outlet 40. Driving means 104 are needed to drive the mixing, pumping and foaming unit 102: these driving means 104 can be either provided in the device 300 itself or they can be arranged externally, in a machine to which the device is connected.

The device 300 of FIG. 1 works as it will be explained in what follows. Preferably, the pumping element 110 is configured as a pair of gears, such that their rotation is able to suck/pump fluid and powder from the container 20 through the fluid inlet 21, and possibly also air from the air entry 30. The foaming element 120 comprises a rotating element with respect to an external fixed element, configuring a thin gap between the two elements (foaming chamber 21) through which a mixture is subjected to high shear stress and can therefore be foamed. The typical configurations of the foaming element 120 are of a cylinder, or of a cone or of a disc. First, the valve 31 closes the air entry 30 so, when the gears rotate, only powder and fluid are pumped from the container 20 into the pumping and foaming unit: as there is no air, the powder and fluid are actually not foamed but only mixed in the pumping element 110 and further in the foaming element 120. Further loops can be made with no air being added into the mixture, in order to efficiently mix powder and fluid, which are then sent to the container 20 through the foam outlet 40. The mixture of powder and fluid is now considered as a fluid itself. In a later stage, the valve 31 is opened and regulates a certain amount of air introduced into the fluid inlet 21 (further, the check valve 33 avoids any fluid or powder going into the air entry 30, as represented in FIG. 1. The rotation of the gears now pumps the mixture of fluid and powder from the container 20 and also air from the air entry 30: this mixture is foamed by Couette Flow effect in the foaming chamber 121 of the foaming element 120, and it is delivered into the container 20 through the foam outlet 40. As the foam is of less density than the rest of the mixture (fluid and powder), it is deposited on the top part of the container 20, over the mixture of fluid and powder: further iterations allow that the pumping element 110 (as shown in FIG. 1, the fluid inlet 21 is connected to the bottom part of the container 20) pumps the mixture of fluid and powder, which is foamed in the foaming element 120 and is deposited on top in the container 20, until the whole content of the container has been foamed (or the amount of it that is desired). Optionally, the foam can be heated before being delivered in the container 20, by means of a heating unit 103 connected before the foam outlet 40.

One advantage of the invention is that one single driving means 104 entrain in rotation both the pumping element 110 and the foaming element 120, so with one rotation the actions of pumping and mixing (when no air is added through the air entry 30) or pumping and foaming (when air is added through the air entry 30) are achieved.

Figure 2:
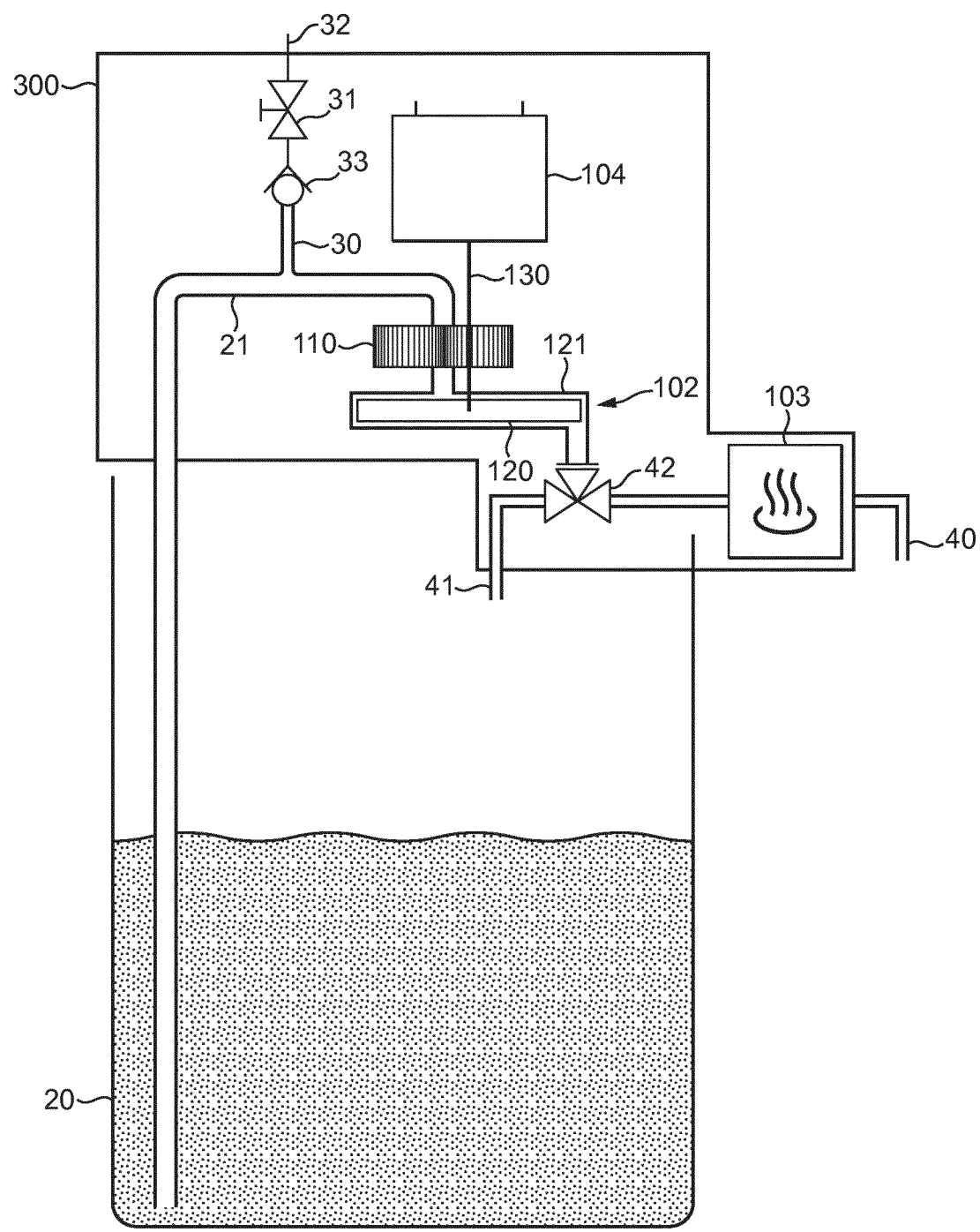
FIG. 2 shows a schematic view of a mixing and foaming device according to a second possible embodiment of the present invention.

With reference now to FIG. 2, a device 300 according to a second preferred embodiment is disclosed: the device 300 comprises a container 20 where fluid (typically water) and powder are arranged, communicating with a mixing, pumping and foaming unit 102 through a fluid inlet 21. Similarly, the mixing, pumping and foaming unit 102 comprises a foaming element 120 with a foaming chamber 121 and a pumping element 110. Driving means 104 entrain in rotation both the foaming element 120 and the pumping element 110; these driving means 104 can be part of the device 300 or can be arranged externally, as part of a machine to which the device 300 is connected. The device 300 further comprises an air entry 30 through which air is introduced in the fluid inlet 21 and from there into the mixing, pumping and foaming unit 102, the quantity of air being regulated by means of a valve 31. The air entry 30 is preferably further provided with a check valve 33 allowing the entry of air through the air entry 30 and into the fluid inlet 21, but preventing any backflow of fluid from the fluid inlet 21 into the air entry 30. Further, the device 300 according to this second embodiment comprises a three-way valve 42 and an optional heating unit 103, the three-way valve 42 allowing communication of the exit of the mixing, pumping and foaming unit 102 either with a container outlet 41 or with the heating unit 103 and, from there, with the foam outlet 40. According to this second embodiment of the invention, there is a container outlet 41 communicating the outlet of the mixing, pumping and foaming unit 102 with the container 20 and a final foam outlet 40 (once the foam is prepared and is finally delivered) communicating directly with a cup or container, ready for consumption.

The device 300 of FIG. 2 works as it will be now explained in detail. The pumping element 110 is preferably configured as gears: their rotation pumps powder and fluid from the container 20 through the fluid inlet 21: the valve 31 is closed so no air is added through the air entry 30: the mixture of fluid and powder pumped is mixed by passing through the pumping element 110 and further through the foaming element 120: the three-way valve 42 is in a position where the container outlet 41 is open and the foam outlet 40 is closed. Therefore, the mixture of fluid (typically water) and powder is sent again into the container 20 through the container outlet 41. Further iterations as the one described are effected so that the fluid and the powder are intimately and properly mixed. Moreover, as the fluid inlet 21 is configured as a pipe connected to the bottom of the container 20, the remaining powder (which is heavier and therefore tends to be arranged at this bottom) will be pumped into the mixing, pumping and foaming unit 102 until the whole content of the container 20 has been properly mixed. Once the mixture has been prepared, the valve 31 is opened and regulated according to the desired amount of air that has to be introduced through the air entry 30: therefore, by the rotation of the pumping element 110, both the mixture (fluid and powder) from the container 20 and the air from the air entry 30 are pumped into the foaming element 120, particularly into the foaming chamber 121 where the mixture together with air is foamed. The three-way valve 42 is now in a position where the container outlet 41 is closed and the foam outlet 40 is opened. Therefore, once the mixture and air is foamed in the foaming element 120, it can optionally be heated in the heating unit 103 and then, heated or not, is sent through the foam outlet 40 directly into cup.

Figure 3:
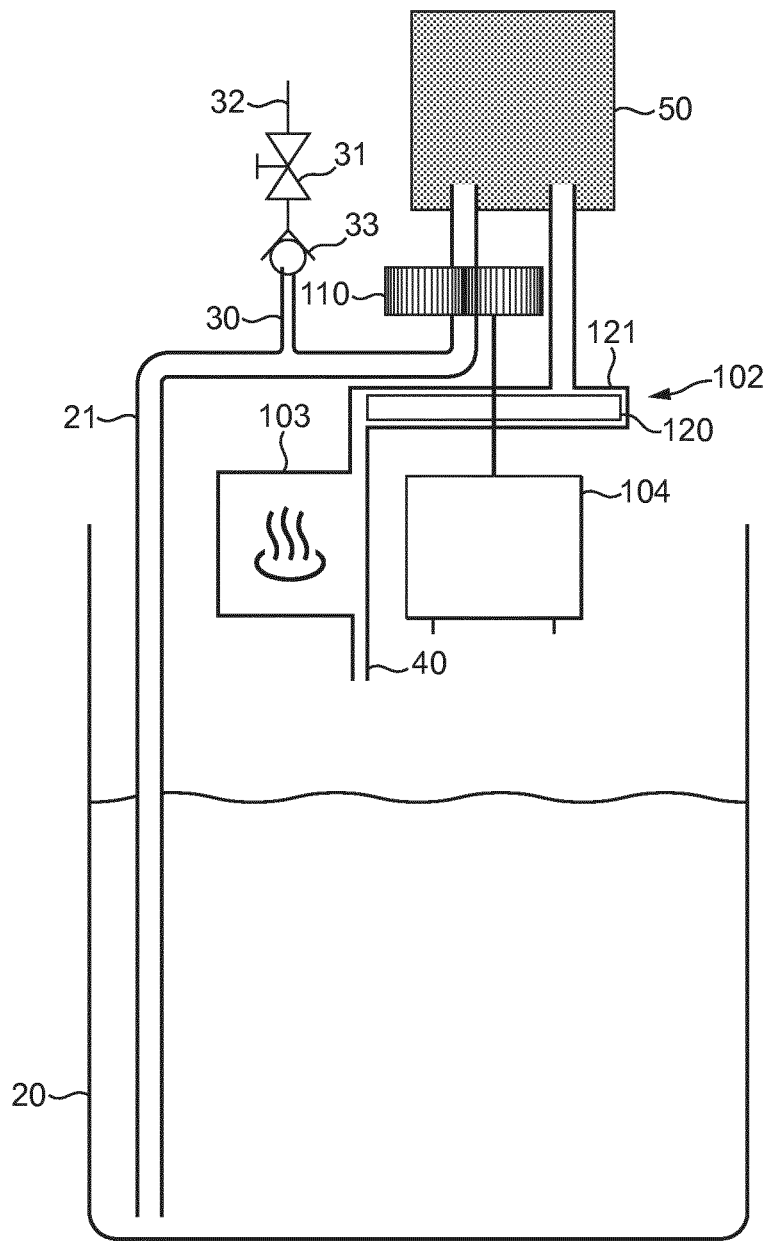
FIG. 3 shows a schematic view of a mixing and foaming device according to a third possible embodiment of the present invention.

Reference is made now to FIG. 3, where a device 300 according to a third preferred embodiment of the invention is shown. In FIG. 3 it is shown another possibility of the device 300 that uses a sachet or pouch 50 where powder is arranged, which is further diluted with fluid (preferably with water) coming from a container 20. The sachet 50 is connected to the device 300 in order to produce the foam, as represented in FIG. 3. Even if a pouch or sachet has been depicted, other possible containers 50 such as a capsule or the like can be similarly used, comprising the powder. Preferably, these containers (pouch, sachet, capsule, etc.) are made disposable but they can also be configured as a cavity for example that will be filled with powder by the user. The device 300 of FIG. 3 comprises similar elements as those in FIG. 1 or 2: a mixing, pumping and foaming unit 102, comprising a foaming element 120 with a foaming chamber 121 and a pumping element 110, driving means 104 entraining in rotation both the foaming element 120 and the pumping element 110, and a heating unit 103 for optionally heating the foam before it is delivered through the foam outlet 40. The device 300 further comprises a fluid inlet 21 and an air entry 30, the air entry being regulated through a valve 31 and preferably also comprising a check valve 33.

The device shown in FIG. 3 works as it will be now explained. The sachet or pouch 50 comprising the powder is connected to the mixing, pumping and foaming unit 102 of the device. First, the valve 31 regulating the air into the air entry 31 is closed, so when the pumping element 110 (typically configured as gears) rotates, only fluid is pumped from the container 20 through the fluid entry 21 into the sachet 50, so the powder is diluted with the fluid coming from the container 20. Further, both powder and fluid are sent into the foaming element 120 and, when passing through the foaming chamber 121, fluid and powder are mixed and are then sent back to the container 20 through the foam outlet 40. This operation is repeated a plurality of times, until powder and fluid are intimately and properly mixed. Once the mixture has been obtained in the container 20, the valve 31 opens and, when the pumping element 110 rotates, it pumps the mixture from the container 20 and also air from the air entry 30 into the pouch or sachet 50 and, from there, into the foaming element 120. When this mixture of fluid and powder together with air goes through the foaming chamber 121 and is subjected to shear forces, it is foamed. The resulting foam can then be optionally heated in the heating unit 103 before being delivered into the container 20 through the foam outlet 40. As disclosed for FIG. 1, the produced foam has low density and is therefore arranged on top of the container 20: the fluid stays on the lower bottom of the container 20, so that the fluid inlet 21 pumps fluid from the bottom of the container 20 and the foam outlet delivers prepared foam over it, until the desired ratio of fluid and foam is reached or until the whole of the fluid has been foamed.

According to the invention, a device is provided that works in different phases: in a first phase, proper mixing of the powder and fluid is achieved and, in a second phase, foaming of this prepared mixture is done by using Couette flow effect subjecting the mixture to high shear stress a foaming chamber.

Further, the device 300 of the invention is able to produce very high quality foam on demand, having a simple architecture and being easily cleanable. Typically, the parts which are in contact with the fluid (typically milk or a food or beverage product) can be easily detached and cleaned or are made disposable (as the pouch or sachet 50 in FIG. 3).

The driving means 104 of the invention typically comprises an electrical motor.

The pumping element 110 and the foaming element 120 are both driven by a single driving means 104: typically, they are both driven in rotation by a same single shaft 130 connected to both, as shown in FIG. 1. The shaft 130 is entrained in rotation by a single motor configuring the driving means 104.

The pumping element 110 is typically configured as gears (gear elements) rotating at high speed. Preferably, the rotation speed of the pumping element 110 (and also of the foaming element 120 as they rotate at the same speed) is typically comprised between 2000 and 10000 rpm, preferably between 4000 and 8000 rpm. The module (i.e. the size), the number and the height of the teeth configuring the gears in the pumping element 110 need to be carefully chosen, together with the shape and size of the foaming element 120, so as to have a good balance between the pumping performance of the pumping element 110 and the foaming capability of the foaming element 120 (i.e. so as to obtain the desired balance of pumping and foaming in the device). Typically, a too efficient pumping would result in bad quality foam.

The foaming element 120 in the device of the invention comprises a rotatable part with respect to another part, preferably static, such that a small gap is created between the two configuring the foaming chamber 121, subjecting a product that passes through this gap to high shear forces creating a Couette Flow effect. The rotatable part in the foaming element 120 can be configured as a cone, as a disc or as a cylinder, for example.

Optionally, the device 300 of the invention can also comprise control means which will manage and control the foaming process parameters in the device 300. It is also possible that the device comprises no control means, meaning that the user will then adjust manually part or all of the parameters of the foaming process in the device.

Therefore, for a given type of fluid (i.e., the fat and protein content and the processing conditions during the fluid manufacture are fixed values), the properties of the foam obtained (quantity/size of bubbles, stability and overrun) for this fluid will be determined by the foaming process carried out in the device of the invention, specifically by the process parameters detailed as follows.

Fluid flow rate passing from the container 20 into the device 300 which depends on the rotational speed of the mixing, pumping and foaming unit 102 and on the diameter of the fluid inlet 21 providing fluid from the container 20.

Amount of air coming through the air entry 30, also depending on the rotational speed of the pumping element 110 and on the regulation of the adjustable valve 31.

The sachet or pouch 50 can also comprise a code, typically a bar code, comprising the information of process parameters, which is provided to the control means in the machine to carry out the foaming process in an optimal way.

In the Couette flow effect carried out in the foaming element 120, the shear stress experienced by the mixture of fluid and powder together with air depends largely on the width of the gap formed between the external surface of the foaming element 120 and the inner walls of the foaming chamber 121: this width is chosen depending on the type of foamable fluid or foamable food or beverage product to be foamed, chosen in such a way that optimal foaming effect by shear (Couette flow) is obtained. Typically, the width of the gap is larger as more viscous the fluid or food to be foamed is: for example, milk would require a smaller gap than liquid yogurt and these last a smaller gap than foamable food or beverage products. Typically, the width of the gap for milk is around 0.3 mm and the width for liquid yogurt and for foamable food or beverage products is bigger.

The device of the invention is advantageously configured as cleanable, cleaning being able to be made in a very easy way. The container 20 can be separated from the rest of the device for its easy cleaning. The pumping element 110 (gears) and the foaming element 120 (cylinder, cone, disc or the like) can also be separated from the rest of the device 300 in order to be cleaned. As previously explained, no other parts are in contact with foamable fluid or food that need to be cleaned for hygienic reasons.

Some of the main advantages of the device of the invention are:
  Superior micro foam being delivered
  Efficient mixing of powder and fluid is provided
  Adjustable foam density, by acting on the air entry and optionally on the adjustable air valve
  Simple architecture (only one motor to drive the pumping and foaming axis)
  In-line system
  Embodiments allowing a very easy cleaning
  Variety of foamable products to be foamed (from fluid to food liquid products)

Although the present invention has been described with reference to preferred embodiments thereof, many modifications and alterations may be made by a person having ordinary skill in the art without departing from the scope of this invention which is defined by the appended claims.

The invention claimed is:

1. A mixing and foaming device configured for mixing a powder food or beverage product with a fluid to form a mixture and further foaming the mixture, the device comprising:
  a mixing, pumping and foaming unit, an air entry and a fluid inlet; and
  the mixing, pumping and foaming unit comprising a pumping element configured to rotate to allow both the powder food or beverage product and the fluid to enter a foaming chamber of the mixing, pumping and foaming unit, the mixing, pumping and foaming unit further comprising a foaming element configured to rotate relatively within the foaming chamber, thereby subjecting the mixture of the fluid and the powder food or beverage product to a certain level of shear stress which allows the mixture to mix and/or to foam, wherein the pumping element comprises gears comprising teeth, wherein module and/or number and/or height of the teeth configures the gears in the pumping element and the shape and/or size of the foaming element are calculated to have a specific balance of mixing performance, pumping performance and foaming capability, respectively, provided by the device, wherein the pumping element and the foaming element are connected to a single shaft and are entrained in rotation by driving means such that one rotation of the shaft achieves both a) pumping of the fluid and the powder food or beverage product into the foaming chamber and b) the mixing of the fluid and the powder food or beverage product in the foaming chamber.

2. The mixing and foaming device according to claim 1, wherein the foaming element comprises a rotatable element with respect to a stationary part in the foaming chamber defining a gap where the mixture of the fluid and the powder food or beverage product is driven under shear stress.

3. The mixing and foaming device according to claim 2, wherein the rotatable element has a form selected from the group consisting of a cylinder, a cone, and a disc.

4. The mixing and foaming device according to claim 2, wherein the gap in the foaming chamber is between 0.2 and 1 mm.

5. The mixing and foaming device according to claim 1, comprising a check valve connected to the air entry and configured for preventing any back-pumping of the fluid and/or the powder food or beverage product.

6. The mixing and foaming device according to claim 1, comprising a heating unit configured for heating the foam from the mixing, pumping and foaming unit before the foam is delivered.

7. The mixing and foaming device according to claim 1, wherein the powder food or beverage product is in a container together with the fluid, the rotation of the pumping element pumping both the fluid and the powder food or beverage product from the container into the foaming chamber.

8. The mixing and foaming device according to claim 1, wherein the powder food or beverage product is in a reservoir in the device.

9. The mixing and foaming device according to claim 8, wherein the rotation of the pumping element pumps the fluid into the reservoir where the fluid is diluted with the powder food or beverage product, the rotation of the pumping element further pushing the fluid and the powder food or beverage product into the foaming chamber.

10. The mixing and foaming device according to claim 1, wherein the pumping element and the foaming element rotate at a speed between 2000 and 10,000 rpm.

11. The mixing and foaming device according to claim 1, comprising a valve regulating the amount of air introduced through the air entry.

12. The mixing and foaming device according to claim 1, wherein the gears of the pumping element are configured such that rotation of the gears suck the powder food or beverage product and the fluid through the fluid inlet toward the foaming chamber of the mixing, pumping and foaming unit.

13. A method for providing foam from a food or beverage product powder using a device, the method comprising:
   a) pumping fluid and food or beverage product powder from a container into a foaming chamber by rotating a pumping element;
   b) mixing the fluid and the food or beverage product powder in the foaming chamber to form a mixture by relatively rotating the foaming element within the foaming chamber and sending the mixture to the container, wherein the pumping element comprises gears comprising teeth, wherein module and/or number and/or height of the teeth configures the gears in the pumping element and the shape and/or size of the foaming element are calculated to have a specific balance of mixing performance, pumping performance and foaming capability, respectively, provided by the device, wherein the pumping element and the foaming element are connected to a single shaft and are entrained in rotation by driving means such that one rotation of the shaft achieves both step a) and step b);
   c) repeating steps a) and b) one or a plurality of times;
   d) opening an air entry to a certain level;
   e) pumping from the container into the foaming chamber the mixture of the fluid and the food or beverage product powder, together with air from the air entry by rotating the pumping element; and
   f) subjecting the mixture of the fluid and the food or beverage product powder, together with the air, to shear stress in the foaming chamber so that the mixture foams.

14. The method according to claim 13, comprising heating the foam in a heating unit before the foam is finally delivered.

15. The method according to claim 13, wherein the air entry is closed during steps a), b) and c) such that no air passes through the air entry.

16. A method for providing foam from a food or beverage product powder using a device for mixing the food or beverage product powder with a fluid to form a mixture and further foaming the mixture, the device comprising: a mixing, pumping and foaming unit, an air entry and a fluid inlet; and the mixing, pumping and foaming unit comprising a pumping element configured to rotate to allow both the food or beverage product powder and the fluid to enter a foaming chamber of the mixing, pumping and foaming unit, the mixing, pumping and foaming unit further comprising a foaming element configured to rotate relatively within the foaming chamber, thereby subjecting the mixture of the fluid and the food or beverage product powder to a certain level of shear stress which allows the mixture to mix and/or to foam, the method comprising:
   a) pumping fluid into a reservoir by rotating the pumping element, so that the food or beverage product powder is diluted with the fluid;
   b) mixing fluid and food or beverage product powder in the foaming chamber by relatively rotating the foaming element within the foaming chamber and sending the mixture to a fluid container, wherein the pumping element comprises gears comprising teeth, wherein module and/or number and/or height of the teeth configures the gears in the pumping element and the shape and/or size of the foaming element are calculated to have a specific balance of mixing performance, pumping performance and foaming capability, respectively, provided by the device, wherein the pumping element and the foaming element are connected to a single shaft and are entrained in rotation by driving means such that one rotation of the shaft achieves both step a) and step b);
   c) repeating steps a) and b) one or a plurality of times;
   d) opening the air entry to a certain level;
   e) pumping from the fluid container into the reservoir and then sending to the foaming chamber the mixture of the fluid and the food or beverage product powder, together with air from the air entry by rotating the pumping element; and
   f) subjecting the mixture of the fluid and the food or beverage product powder, together with air, to shear stress in the foaming chamber so that the mixture foams.

17. The method for according to claim 16, comprising heating the foam in a heating unit before the foam is finally delivered.

18. The method according to claim 16, wherein the air entry is closed during steps a), b) and c) such that no air is added to the mixture of the fluid and the food or beverage product powder.

* * * * *